Figure 1:
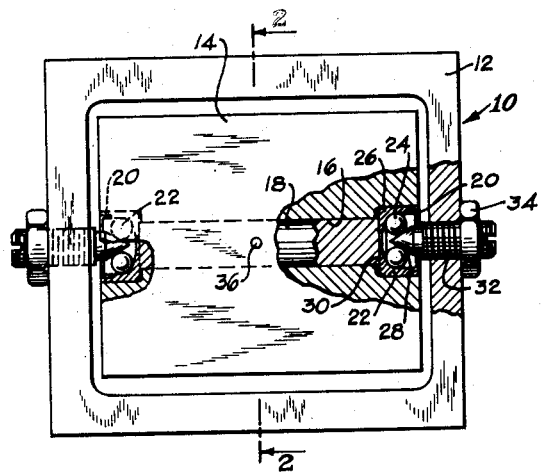

May 19, 1953     R. C. SASSE     2,639,203
PRELOADED BEARING WITH TEMPERATURE COMPENSATION
Filed Dec. 30, 1950

INVENTOR.
RICHARD C. SASSE.
BY Victor D. Behn
ATTORNEY

Patented May 19, 1953

2,639,203

UNITED STATES PATENT OFFICE 2,639,203

PRELOADED BEARING WITH TEMPERATURE COMPENSATION

Richard C. Sasse, Packanack Lake, N. J., assignor to Curtiss-Wright Corporation, a corporation of Delaware Application December 30, 1950, Serial No. 203,685

1 Claim. (Cl. 308—159)

This invention relates to bearings and is particularly directed to a bearing construction having means for compensating for temperature changes.

The pivotally mounted members of sensitive indicators and/or control elements are usually supported by bearings having a conical race for axially loading the bearings against the associated pivotally mounted member thereby taking up all axial clearance and accurately mounting said member. In such an instrument the axial loading of the bearings against their associated pivotal member generally will vary with changes in temperature so that if the temperature changes are large considerable axial play will develop in the bearings whereupon the pivotal member is no longer mounted with precision about a predetermined axis. An object of the present invention comprises the provision of means for pivotally mounting a member by ball bearings such that changes in temperature have substantially no effect on the precision with which said member is pivotally supported. The bearing construction of the present invention has been designed for use in connection with control devices for ram jet engines but, as will appear, is of general application.

In accordance with the present invention, a pivotally mounted member is provided with a rod-like insert having substantially the same coefficient of expansion as the structure on which said member is supported, said member being journaled on ball bearings having adjustable conical inner races for axially loading said bearing against said rod-like insert.

Figure 2:
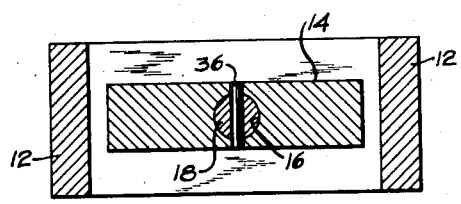

Other objects of the invention will become apparent upon reading the annexed detailed description in connection with the drawing in which:

Figure 1 is a view, partly in section, of a portion of a control instrument embodying the invention; and Figure 2 is a sectional view taken along lines 2—2 of Figure 1.

Referring to the drawing, a portion of a control instrument is schematically indicated at 10, said instrument comprising a frame or supporting member 12 within which a plate-like member 14 is pivotally supported. The member 14 is intended to function as a lever in a control instrument, a plurality of variable forces being applied to said member or lever 14 for producing a desired control force. However, details of the control instrument 10 form no part of the present invention except for the construction of the member 14 and the manner in which said member is pivotally supported.

The member 14 is made of steel in order that it be hard enough to withstand the forces to be applied thereto. The control instrument 10 has been designed for use in connection with a control system for an aircraft ram jet power plant so that said instrument should be as light in weight as possible. Accordingly the frame member 12 is made of a lightweight metal such as aluminum.

The member 14 is provided with a bore 16 within which a rod-like member 18 is inserted. The rod-like member 18 is made up of material having substantially the same temperature coefficient of expansion as that of the supporting frame member 12. In addition the fit between the rod-like member 18 and the bore 16 is such as to permit longitudinal thermal expansion and contraction of the rod-like member 18 relative to the member 14 upon changes in temperature within the temperature range encountered by the instrument 10 during operation. For example, if the rod-like member 18 were made of aluminum and the member 14 were made of steel and the rod-like member 18 had a diameter of the order of 0.25 inch, then a room temperature diametrical clearance of 0.0007 inch between the rod-like member and its bore 16 would be sufficient to permit longitudinal expansion of the rod-like member 17 within the member 14 throughout a temperature range above room temperature of about 500° F.

The member 14 is pivotally supported by a pair of ball bearings 20 disposed at the opposite ends of the bore 16, the ends of said bore being counterbored as indicated at 22 to receive said bearings. The balls 24 of each ball bearing are disposed between an outer race 26 and an inner race 28. The outer race 26 of each bearing is carried by the member 14 within a counterbored end of the bore 16 so as to be axially movable therein, each outer race 24 having an annular inturned flange 30 adapted to engage the adjacent end of the rod-like member 18. The inner race 28 of each bearing is conical and has its apex directed toward the adjacent end of the rod-like member 18. Each said inner bearing race 28 comprises the conical or pointed end of a stud 32 threaded in the frame member 12. A nut 34 is provided for locking each stud 32 in any desired position of threaded adjustment on the frame member 12.

With the aforedescribed construction, by screwing the studs 32 into or out of the frame member 12, the conical inner bearing races 28 are moved relative to the frame member toward or away from the adjacent ends of the rod-like member 18 for loading or pressing the bearing races 24 against the ends of said rod-like member to the desired extent. Then if the temperature should increase or decrease the rod-like member 18 will expand or contract to substantially the same extent as the frame member 12 so that the loading of the bearings against the rod-like member 18 remains unchanged whereby the precision of the pivotal support of the member 14 is maintained. In the absence of the rod-like member 18, the inner bearing races 28 would move away from their respective outer bearing races 26 upon an increase in temperature whereupon the member 14 would no longer be pivotally supported with the desired precision.

With the structure so far described, the dimensions at room temperature may be such that the bearing races 26 also engage the shoulders formed on the member 14 by the counterbores 22 thereby preventing axial freedom of the member 14 relative to the rod-like member 18 and frame 12 at room temperature. However as the temperature increases, the rod-like member 18 expands relative to the member 14 whereupon axial clearance develops between the member 14 and the bearing races 26 thereby permitting axial movement of the member 14 relative to the rod-like member 18 and the frame 12. To prevent any such axial freedom of the member 14, a pin 36 may be inserted through the rod-like member 18 and member 14, preferably midway between the ends of the rod-like member. In lieu of the pin 36, one of the outer bearing races 26 may be rigidly secured to the member 14 thereby effectively preventing any such axial freedom.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

A pivot bearing construction comprising a support structure; a first member; rod-like second member having a different temperature coefficient of expansion from that of said first member and having substantially the same temperature coefficient of expansion as that of said support structure, said rod-like second member extending through and being supported by said first member so that said first member can expand and contract relative to said rod-like second member; and a pair of ball-type bearings disposed adjacent to the opposite ends of said rod-like second member and each comprising a conical inner ball race carried by the support structure and an outer ball race carried by said first member for pivotally supporting said first and second members from said support structure, each said outer ball race axially abutting the adjacent end of said rod-like second member and being fitted within said first member for axially sliding movement relative thereto.

RICHARD C. SASSE.

References Cited in the file of this patent
UNITED STATES PATENTS

| Number | Name | Date |
|---|---|---|
| 2,244,603 | Bauer | June 3, 1941 |
| 2,533,862 | Williams | Dec. 12, 1950 |